Patented June 23, 1942

2,287,073

UNITED STATES PATENT OFFICE 2,287,073

METHOD FOR PRODUCING CHROMIUM-BEARING ALLOYS

Marvin J. Udy, Niagara Falls, N. Y.

No Drawing. Application November 8, 1939, Serial No. 303,363

11 Claims. (Cl. 75—27)

This invention relates to metallurgy and has for an object the provision of improved metallurgical processes. More particularly the invention contemplates the provision of improved methods of producing chromium-bearing alloys. An important object of the invention is to provide improved methods of incorporating low-carbon ferrochromium in molten metals such, for example, as molten iron and steel.

The method of the present invention comprises incorporating chromium in molten metal by igniting a novel exothermic mixture in contact with the molten metal.

The exothermic mixtures used in accordance with the invention comprise particles of ferrochrome silicon and oxidizing material capable of reacting with silicon to develop a temperature higher than the melting temperature of low-carbon ferrochromium. The ferrochrome silicon employed in forming my exothermic mixtures of the invention is low in carbon and relatively low in silicon, containing, for example, less than about forty (40%) percent of silicon, and it is formed by oxidizing a portion of the silicon of high-silicon ferrochrome silicon to form modified ferrochrome silicon containing silicon in predetermined proportion relatively to iron and chromium.

By employing in the reaction mixtures of my invention relatively low-silicon ferrochrome silicon produced by oxidizing a portion of the silicon of high-silicon ferrochrome silicon, it is possible to form reaction mixtures capable of reacting to produce molten ferrochromium products of extremely low-carbon contents. According to some heretofore customary practices, low-carbon ferrochromium is produced from chromite ore by first reducing the ore with coke to form high-carbon ferrochromium, then smelting the high-carbon ferrochromium with coke and silica to form low-carbon ferrochrome silicon and, finally, eliminating the silicon from the ferrochrome silicon by oxidation. Oxidation of the silicon of the ferrochrome silicon is carried out in several stages. In the first stage, the ferrochrome silicon in finely divided form may be incorporated in a self-propagating reaction mixture with chromium-bearing material such as chromite ore and oxidizing material such as sodium nitrate, and the reaction mixture ignited. The resulting reaction produces slag and molten low-carbon ferrochrome silicon containing silicon in an amount which may be as low as about five percent by weight. The low-silicon, low-carbon ferrochrome silicon thus produced is subsequently smelted with chromite ore in an open-arc electric furnace to effect further elimination of silicon.

In the smelting of high-carbon ferrochromium with silica and coke, silicon of the silica is reduced and enters the molten ferrochromium, forming ferrochrome silicon and causing elimination of carbon. The amount of carbon eliminated depends upon the amount of silicon introduced into the metal within certain limits. In the case of high-chromium ferrochromium, the carbon content can be reduced readily to an amount in the neighborhod of about 0.10 percent by incorporating sufficient silicon to form ferrochrome silicon containing about forty percent of silicon. The carbon content is only slightly further diminished as the silicon content is increased about forty percent. Even when amounts of silicon equal to or greater than fifty percent of the weight of the resulting ferrochrome silicon are incorporated, the carbon content is rarely reduced below about 0.04 percent of the weight of the ferrochrome silicon. Since it is desirable to produce low-carbon ferrochromium containing not more than 0.10 percent carbon, it is customary to incorporate at least about fifty percent of silicon in the ferrochrome silicon in an effort to assure the production of ferrochromium containing substantially less than 0.10 percent carbon upon elimination of the silicon. The production of ferrochromium of such desirably low-carbon content is difficult to accomplish when the final stage of oxidation of the silicon is carried out in an open-arc electric furnace because of carbon pick-up resulting from the use of carbon electrodes.

In producing low-carbon ferrochromium for use in accordance with the methods of the present invention, advantage is taken of the reducing capacity of the silicon employed for carbon elimination to dilute the ferrochrome silicon with iron and chromium and further reduce the ratio of carbon to iron and chromium. Also, my invention effects the final carbon elimination through oxidation by means of substantially carbon-free oxidizing material in an environment free of contaminating carbon. My invention may effect the final silicon elimination by means of exothermic reaction in which the silicon eliminated is made to perform useful work, or the final silicon elimination may be effected by adding the low-carbon, low-silicon ferrochrome silicon directly to a bath of molten metal such as iron and steel, melting it in contact with the bath and thereafter treating the molten metal bath with carbon-free oxidizing material to remove silicon introduced by the ferrochrome silicon. The low-carbon, low-silicon ferrochrome silicon added directly to molten metal preferably contains about five to ten (5% to 10%) percent of silicon.

The final carbon content of any low-carbon, low-silicon ferrochrome silicon product of any silicon content will depend to some extent upon the initial carbon content of the high-silicon ferrochrome silicon and the quantity of silicon oxidized in forming the low-carbon, low-silicon ferrochrome silicon.

As the result of the partial oxidation of silicon of high-silicon ferrochrome silicon, containing silicon in excess of forty percent, in the production of low-carbon, low-silicon ferrochrome silicon containing about five to ten (5% to 10%) percent of silicon, with accompanying dilution and carbon oxidation, the carbon content usually can be reduced to an amount substantially lower than 0.10 percent or even substantially lower than 0.05 percent, and it may be reduced to the point at which the low-carbon, low-silicon ferrochrome silicon is practically carbon-free, containing carbon in the amount of about 0.01 percent or less. The exothermic reaction mixtures employed are carbon-free and the danger of carbon pick-up inherent in the use of the open-arc electric furnace is avoided through their use.

Dilution of the ferrochrome silicon with chromium or with iron and chromium while eliminating silicon is accomplished by employing for oxidation of the silicon an oxygen-containing compound of chromium such as calcium chromate or materials containing oxidized iron and chromium such as chromite ore and oxidized ferrochromium. Oxidation of the silicon results in reduction of the chromium or the iron and chromium to the metallic state. The molten metal thus produced is carbon-free, and, upon alloying with the molten ferrochrome silicon, it increases the proportions of iron and chromium relatively to carbon and thus produces a ferrochrome silicon product of lowered carbon content relatively to the iron and chromium contents.

High-silicon ferrochrome silicon for use in practicing the present invention may be produced in any suitable manner. Thus, for example, in carrying out complete processes of my invention high-silicon ferrochrome silicon may be produced from chromite ore by first smelting the ore with carbon to produce high-carbon ferrochromium and, thereafter, smelting the high-carbon ferrochromium with carbon and silica, or high-silicon ferrochrome silicon may be produced by direct smelting of the ore with carbon and silica in accordance with the process described in my United States Patent No. 2,176,689. In both cases, the silicon of the high-silicon ferrochrome silicon accomplishes the same result, namely, elimination of carbon from, or the prevention of inclusion of carbon with, the metallic iron and metallic chromium produced by reduction of the chromite ore.

In a preferred complete process of my invention silicon is incorporated in the high-carbon ferrochromium in amount substantially greater than the amount necessary to accomplish the production of ferrochrome silicon containing about 0.05 percent carbon, and the excess silicon is used to effect chromium reduction, or chromium and iron reduction, with resulting dilution of the ferrochrome silicon. In such a preferred complete process the ferrochrome silicon produced contains substantially more than fifty percent and preferably more than sixty percent silicon. The excess silicon insures the accomplishment of maximum carbon elimination and it provides a desirable source of relatively inexpensive non-carbonaceous reducing agent.

The exothermic reaction mixtures used in accordance with the invention preferably are of such compositions as to be capable upon ignition on the surface of a molten bath of metal such as iron or steel of delivering to the molten metal of the bath molten low-carbon ferrochromium. The reaction mixtures may be of such compositions as to be capable, upon ignition in a previously unheated environment, of producing molten low-carbon ferrochromium by means of self-propagating reactions. The heat developing capacity of any reaction mixture produced in accordance with the invention preferably will be determined on the basis of the contemplated use of the reaction mixture. For example, if the reaction mixture is to be placed on the surface of a molten bath of metal, such as iron or steel, at a relatively high temperature and containing excess heat available for melting or for aiding in melting metal present as such in the mixture and any metal which may be produced by reaction upon ignition of the mixture, the components of the reaction mixture may be so selected and proportioned as to provide a relatively low heat developing capacity. If, on the other hand, the reaction mixture is to be placed on the surface of a relatively cold bath of molten metal containing no available excess heat for melting or for aiding in melting metal, or, if the reaction mixture is to be placed on the surface of a bath of molten metal the temperature of which should be increased, the components of the reaction mixture may advantageously be so selected and proportioned as to provide a relatively high heat developing capacity in order to melt the metal present as such and any metal which may be produced by reaction upon ignition of the mixture and to establish the molten metal at the desired temperature. By proving exothermic reaction mixtures capable of delivering molten ferrochromium by reaction upon ignition, the necessity of employing only the higher grades of ores as sources of chromium is eliminated since the danger of chilling molten metal by the addition of solid metal is eliminated. Thus, the invention makes available as sources of chromium ores of all grades which can be smelted commercially to produce metal products containing iron and chromium.

The composition of a reaction mixture of my invention with respect to components other than the low-carbon, low-silicon ferrochrome silicon depends upon the silicon content of the ferrochrome silicon employed. For example, if the ferrochrome silicon contains only an amount of silicon capable of developing by reaction with oxidizing material sufficient heat to melt the iron and chromium of the ferrochrome silicon under the conditions of use contemplated, a reaction mixture produced will consist essentially of ferrochrome silicon and one or more oxidizing materials such as an alkali metal nitrate or an alkali metal chlorate (sodium nitrate or sodium chlorate) which is free of metallic elements reducible to the metallic state by silicon. Such a mixture may consist, for example, of ferrochrome silicon containing about four to six (4 to 6%) percent silicon by weight and sodium nitrate or sodium chlorate in amount sufficient to oxidize all of the silicon. When the ferrochrome silicon contains an amount of silicon in excess of that capable of developing by reaction with the oxidizing material sufficient heat to melt the iron and chromium of the ferrochrome silicon, the excess silicon may be utilized for reducing a metal compound or for melting metal. Thus, for example, a compound of chromium or low-carbon ferrochromium or both may be incorporated in a reaction mixture with the ferrochrome silicon. The compound of chromium employed may be an oxidizing agent such as a chromate which is capable of developing by reaction with silicon a temperature higher than the melting temperature of low-carbon ferrochromium. Such compounds include, for example, calcium chromate, sodium chromate and sodium dichromate. Other oxidizing agents such as sodium nitrate and sodium chlorate may be employed in conjunction with the chromium-bearing oxidizing agents.

The type and amount of oxidizing material employed in forming a reaction mixture in accordance with my invention depends to some extent upon the contemplated use of the reaction mixture and the results sought to be accomplished. Thus, if the production of substantially silicon-free low-carbon ferrochromium is sought, the oxidizing material will be employed in an amount somewhat in excess of the amount required theoretically (or determined experimentally) to oxidize all of the silicon of the ferrochrome silicon. If the production of low-carbon ferrochromium containing a small amount of silicon is sought a smaller amount of oxidizing material will be employed, the amount depending upon the desired silicon content of the low-carbon ferrochromium sought to be produced. If the production of low-carbon ferrochromium containing iron and chromium in the proportions in which those two elements are to be included in the metallic state in the mixture is sought, oxidizing material (such as sodium nitrate or sodium chlorate) which is carbon-free and free of metallic elements reducible to metal by means of silicon will be employed. If the production of low-carbon ferrochromium containing chromium, or containing iron and chromium, from a source other than the metal to be included in the mixture is sought, the oxidizing material employed may contain one or more low-carbon or carbon-free chromium compounds or chromium and iron compounds containing oxygen available for reaction with silicon such, for example, as calcium chromate, sodium chromate, sodium dichromate and oxidized ferrochromium. Oxidized ferrochromium employed may be produced in accordance with any of the procedures described in my United States Patent No. 2,176,688. Relatively pure chromate compounds may be employed advantageously in the reaction mixtures for raising the grade of low-carbon ferrochromium produced in accordance with the invention, that is, for producing low-carbon ferrochromium containing chromium in greater proportion relatively to iron than in the ferrochrome silicon produced. Oxidizing material employed in forming reaction mixtures in accordance with my invention may consist of a single compound or may comprise two or more compounds in any suitable proportions relatively to one another.

In preparing modified low-carbon, low-silicon ferrochrome silicon for use in forming exothermic mixtures used in accordance with the invention by oxidizing a portion of the silicon of high-silicon ferrochrome silicon I oxidize sufficient silicon to produce ferrochrome silicon products of predetermined compositions with respect to silicon, the compositions being determined by the natures of the other components to be incorporated in the mixtures and by economic considerations. Thus, if a mixture to be produced is to consist of ferrochrome silicon and oxidizing material, such as sodium nitrate or sodium chlorate, I may produce ferrochrome silicon containing about four to six (4 to 6%) percent silicon. If a reaction mixture to be produced is to consist of ferrochrome silicon and a chromate such as calcium chromate, I may produce ferrochrome silicon containing about fourteen to sixteen (14 to 16%) percent or more silicon. If a reaction mixture to be produced is to consist of ferrochrome silicon, one or more oxidizing agents such as sodium nitrate and sodium chlorate and one or more chromate compounds such as sodium chromate, sodium dichromate and calcium chromate, I may produce ferrochrome silicon containing silicon in about the range six to fourteen (6 to 14%) percent, the amount of silicon depending upon the relative proportions to be used of sodium nitrate or sodium chlorate or both on the one hand and the one or more chromate compounds on the other.

The composition with respect to silicon content of any low-carbon, low-silicon ferrochrome silicon products employed in forming reaction mixtures used in accordance with the invention will be determined to some extent on the basis of economic and technical factors such as grinding costs, reagent costs and slag volumes. Products containing more than about fifteen percent of silicon have the more desirable grinding characteristics. Products containing about four to twenty (4 to 20%) percent of silicon produce, upon reaction with oxidizing materials, slag volumes which are not objectionable. For economy in the matter of reagents employed when the low-carbon, low-silicon ferrochrome silicon contains more than about five percent silicon, it is desirable to employ as at least a part of the oxidizing material a compound of chromium in order to employ the silicon for performing useful work. All of the silicon may be employed usefully by employing an oxidizing agent like sodium nitrate or sodium chlorate for oxidizing about five parts of silicon per hundred parts of ferrochrome silicon when the ferrochrome silicon contains silicon in excess of five percent by weight and by employing a chromium compound for oxidizing the remainder of the silicon. Thus, when the ferrochrome silicon contains silicon in an amount up to about twenty percent, calcium chromate may be employed advantageously for oxidizing the remainder. When the ferrochrome silicon contains silicon in excess of about twenty percent by weight, it is advisable to employ a chromium compound containing a smaller proportion of available oxygen than a chromate compound for oxidizing the excess silicon in order to control the volume of slag produced and utilize the silicon efficiently. Thus, sodium nitrate may be provided for oxidizing five parts of silicon per hundred parts of the ferrochrome silicon, calcium chromate may be provided for oxidizing fifteen parts and calcium chromite may be employed for oxidizing the remainder. If the amount of silicon present is substantially greater than twenty percent, for example, about thirty to forty percent, calcium chromate and calcium chromite may be employed for oxidizing all of the silicon.

In forming a reaction mixture to be used in accordance with the invention, the various components preferably are so proportioned as to give reasonable efficiency upon reacting. Thus, the amount and type of oxidizing material employed will be based, in the first instance, upon the amount of silicon to be oxidized from available modified ferrochrome silicon. If the amount of silicon present in the available modified ferrochrome silicon is in excess of that capable of developing by reaction with oxidizing material free of metallic elements reducible to metal by silicon sufficient heat to melt the iron and chromium of the ferrochrome silicon, oxidizing material in the form of reducible metal compounds may be incorporated with the ferrochrome silicon in the reaction mixtures, or solid particles of low-carbon ferrochromium may be incorporated in the mixtures. The amounts of oxidizing material and silicon incorporated in any mixture preferably should be so proportioned as to be capable upon reacting of developing sufficient heat to melt all metal including the iron and chromium of the ferrochrome silicon, any solid low-carbon ferrochromium employed and any metal produced by reduction of reducible metal compounds in the environment in which ignition and reaction of the mixture is carried out.

The relative proportions of metal, silicon and oxidizing material to be incorporated in a reaction mixture may be determined on the basis of theoretical considerations, but, for optimum practical results, it is advisable to determine the proportions to be employed on the basis of experimental results. In producing an exothermic mixture in accordance with my invention, I may employ one part by weight of silicon for oxidation to not less than about eighteen (18) parts by weight of metal to be melted when employing sodium nitrate as the oxidizing material. When the oxidizing material employed contains a compound of a metal reducible to metal by silicon, the quantity of metal which can be melted by oxidation of one pound of silicon is somewhat smaller. In forming exothermic reaction mixtures of my invention, I provide sufficient silicon to produce by its oxidation sufficient heat to melt all metal (including silicon, metal present in the mixture as such and metal produced by reduction upon ignition of the mixture) and a sufficient amount of an oxidizing agent to oxidize all of the silicon provided for oxidation. Oxidation of silicon with the development of suitable quantities of heat and suitably high temperatures may be accomplished satisfactorily by providing sodium nitrate and silicon for oxidation in the proportions, three to four (3.0 to 4.0) parts by weight of sodium nitrate to one (1.0) part by weight of silicon.

The components of reaction mixtures used in accordance with the invention may be employed in the form of particles of any suitable sizes. The components, such as the ferrochrome silicon, reducible metal compounds and oxidizing material (and any fluxing materials employed) which enter into chemical reactions upon ignition of the reaction mixtures preferably are employed in the form of particles minus 100-mesh in size (particles capable of passing a 100-mesh screen) in order to provide for intimate contact which promotes efficiency in reaction. Components which do not enter into the reactions, such as solid low-carbon ferrochromium may be employed in the form of particles of relatively large sizes. The sizes of the particles of non-reacting materials need be limited only by the capacity of the reaction mixture, in the form in which it is employed, to retain the particles within the body of the mixture in the effective reaction zone upon ignition.

When the components are all in the form of relatively small particles (for example, minus 100-mesh) the reaction mixtures may be employed in the form of loose powders as such or packed in suitable bags or containers, or they may be employed in the form of agglomerates in which the particles are bonded together by a bonding agent like sodium silicate or by means of the oxidizing material employed. When the reaction mixtures contain relatively large particles which might settle out of the mixtures if the mixtures should be placed in loose form on the surfaces of molten metal baths, it is desirable to agglomerate the particles and form agglomerates of suitable sizes and shapes which will be capable of retaining the large or coarse particles in the effective reaction zones until molten.

Reaction mixtures of my invention may be agglomerated in any suitable manner as by means of an inert bonding agent such as sodium silicate or by means of an agent such as an oxidizing agent capable of taking part in reactions with other components. I prefer to form agglomerates by employing oxidizing materials capable of functioning as bonding agents for the particles of the mixtures. The oxidizing agents may be employed in finely divided condition or they may be employed in the molten state or in the solid state resulting from solidification from the molten state after mixing with the other components. Bonding by means of the oxidizing agents may be of the type effected through the application of high pressures to quantities of the mixtures; it may be of the type effected through moistening, compacting and heating to drive off moisture; or it may be of the type effected by solidification of the oxidizing agents from the molten state in contact with the other components. Contact of the other components of the reaction mixtures with the oxidizing agents while molten causes effective wetting and coating of the other components with the oxidizing agents and provides for more effective reaction upon ignition. When an oxidizing agent is employed in the solid state resulting from solidification from the molten state, it serves as a bonding agent for bonding together in intimate association the other components of the mixture.

The oxidizing agents employed in forming reaction mixtures when fusion is to be carried out should be selected to insure fusing points below the temperatures at which ignition of the mixtures, with resulting reactions, will take place. Oxidizing agents having suitably low fusing or melting temperatures include many of the oxygen-bearing compounds of alkali metals such, for example, as sodium nitrate, sodium chlorate and sodium dichromate. Other oxidizing agents which may be employed in forming the reaction mixtures include calcium chromate, sodium chromate and manganese dioxide.

Agglomerates in which the oxidizing material serves as the bonding agent may be produced in any suitable manner. The components which enter into the reactions upon ignition, such as the silicon-containing material and the oxidizing material may be ground together to effect intimate mixing, and the resulting mixture may be heated to a temperature sufficiently high to effect fusion of the oxidizing agent without igniting the reaction mixture. Fusion may be carried out in vessels or pans of the sizes and shapes of the agglomerates sought to be produced, in which case the agglomerates may be permitted to cool and solidify in place, or, fusion may be carried out in a master vessel, and the fused mass may be poured into suitable molds for cooling and solidification. Materials, such as metals which do not enter into reactions resulting from ignition may be stirred into the reaction mixtures immediately prior to fusion or after fusion and while the oxidizing material is still molten. In bonding together the components of a reaction mixture by means of the oxidizing material, I may moisten the mixture with an aqueous liquid, form the resulting wet mass into agglomerates under pressure and heat the agglomerates to drive off the water. This procedure produces strong solid agglomerates in many cases even when the agglomerates are heated to a temperature below the fusing temperature of any low fusing point oxidizing agent which may be present in the mixture. Amounts of water equal to about two to three (2 to 3%) percent of the mixture may be employed satisfactorily for wetting a mixture. Wetting and molding may be desirable even when fusion of an oxidizing component of a mixture is to be carried out.

Solid agglomerates of my invention produced by fusing and solidifying the oxidizing materials in contact with the other components and solid agglomerates produced by heating agglomerates of moistened reaction mixtures without fusion provide excellent carriers for materials to be melted by heat developed upon ignition of the mixtures. The agglomerates are very hard and compact and they effectively hold relatively large pieces of metal in the effective reaction zones until they are melted by heat developed in the course of the reactions.

The following examples illustrate the method of the invention:

Example I

Chromite ore of the composition indicated below is smelted by means of the process of my aforementioned United States Patent No. 2,176,689 to produce high-silicon ferrochrome silicon of the composition indicated below:

| Ore: | Per cent |
|---|---|
| $Cr_2O_3$ | 44.0 |
| FeO | 23.8 |
| $SiO_2$ | 6.8 |
| $Al_2O_3$ | 13.8 |
| CaO | 3.0 |

| Ferrochrome silicon: | Per cent |
|---|---|
| Chromium | 28.00 |
| Silicon | 48.00 |
| Iron | 24.00 |
| Carbon | 0.06 |

Chromite ore and ferrochrome silicon of the above-indicated compositions are mixed in solid, finely divided condition to form a charge mixture of the following composition.

| | Pounds |
|---|---|
| Ore | 4000 |
| Ferrochrome silicon | 1600 |

The charge mixture thus formed is smelted in an arc electric furnace of the open-arc or Heroult type to produce low-silicon ferrochrome silicon of about the following composition:

| | Per cent |
|---|---|
| Chromium | 56.00 |
| Silicon | 5.00 |
| Carbon | 0.04 |

Low-silicon ferrochrome silicon thus produced is crushed to form particles small enough to pass a 100-mesh screen (minus 100-mesh) and mixed with sodium nitrate to form an exothermic reaction mixture of the following composition (in parts by weight):

| | Parts |
|---|---|
| Low-silicon ferrochrome silicon | 100 |
| Sodium nitrate | 20 |

The reaction mixture thus formed is moistened with water in amount equal to about two and one-half (2.5%) per cent of the weight of the mixture. The resulting wet mass is briquetted under pressure and heated to a temperature below the decomposition temperature of sodium nitrate but sufficiently high to melt or fuse the sodium nitrate. The briquetted material is then cooled, and, upon cooling, the sodium nitrate solidifies and bonds together the particles of ferrochrome silicon. Such a briquetted material will react exothermically when placed on the surface of a molten bath of metal and will deliver to the molten metal molten low-carbon ferrochromium.

The exothermic reaction mixture may be employed in the loose condition or in bags or other suitable containers as well as in briquetted or agglomerated form, and it may be added to a molten metal bath in a ladle or in a furnace.

Example II

Instead of reducing the silicon of the high-silicon ferrochrome silicon by smelting in an electric furnace with chromite ore, as described in Example I, to produce low-silicon ferrochrome silicon containing about five percent of silicon, I may produce low-silicon ferrochrome silicon of about the same silicon content by forming and igniting a self-propagating exothermic reaction mixture containing the ore, the high-silicon ferrochrome silicon, sodium nitrate and lime in the following proportions by weight. (The components of the mixture preferably should be ground together to form a product consisting largely of particles small enough to pass a 100-mesh screen):

| | Parts |
|---|---|
| Ore | 4000 |
| High-silicon ferrochrome silicon | 2260 |
| Sodium nitrate | 1260 |
| Lime (CaO) | 100 |

Ignition of such a mixture results in the production of low-carbon, low-silicon ferrochrome silicon which may be employed as described above to form exothermic reaction mixtures used in accordance with the invention.

Example III

An exothermic reaction mixture consisting of calcium chromate and low-silicon ferrochrome silicon may be produced by the following procedure:

High-silicon ferrochrome silicon of the composition of that produced in smelting chromite ore in Example I is ground with chromite ore (of the composition of that described in Example I) and sodium nitrate in the following proportions by weight to produce a self-propagating exothermic reaction mixture consisting largely of particles small enough to pass a 100-mesh screen (minus 100-mesh):

| | Parts |
|---|---|
| Ore | 4,000 |
| High-silicon ferrochrome silicon | 3325 |
| Sodium nitrate | 1260 |

Reactions resulting upon ignition produce low-silicon ferrochrome silicon of about the following composition:

| | Per cent |
|---|---|
| Silicon | 15.00 |
| Chromium | 49.50 |
| Iron | 35.50 |
| Carbon | 0.04 |

Low-silicon ferrochrome silicon thus produced is crushed to form particles small enough to pass a 100-mesh screen (minus 100-mesh) and mixed with calcium chromate ($CaCrO_4$) to form an exothermic mixture of the following composition (in parts by weight):

| | Parts |
|---|---|
| Low-silicon ferrochrome silicon | 100 |
| Calcium chromate | 56 |

The reaction mixture thus formed is moistened with water in amount equal to about two and one-half (2.5%) percent of the weight of the mixture. The resulting wet mass is briquetted under pressure to form a compact mass and heated to a temperature below the ignition temperature of the reaction mixture but high enough to drive off all water. Temperatures in the range 400° C. to 650° C. produce satisfactory dehydration. The briquetted material is cooled and, upon cooling, hard, dense briquettes in which the particles of low-carbon ferrochrome silicon are bonded together by means of the calcium chromate are formed. Such briquetted material will react exothermically when placed on the surface of a molten metal bath and will deliver to the molten metal of the bath molten low-carbon ferrochromium.

The exothermic reaction mixture may be employed in the loose condition or in bags or other suitable containers as well as in briquetted or agglomerated form, and it may be added to a molten metal bath in a ladle or in a furnace.

I claim:

1. The method of incorporating chromium in molten metal which comprises igniting in contact with the molten metal an exothermic reaction mixture comprising particles of low-carbon, low-silicon ferrochrome silicon containing not more than twenty percent of silicon and less than 0.10 percent of carbon, and oxidizing material capable of reacting with the silicon of the ferrochrome silicon to develop sufficient heat to melt the iron and the chromium of the ferrochrome silicon and containing a large proportion of one or more compounds of the group consisting of sodium nitrate, sodium chlorate, calcium chromate and sodium dichromate.

2. The method of incorporating chromium in molten metal which comprises igniting in contact with the molten metal an exothermic reaction mixture consisting of particles of low-carbon ferrochrome silicon containing about fourteen to sixteen percent of silicon and less than 0.10 percent of carbon, and calcium chromate.

3. The method of incorporating chromium in molten metal which comprises igniting in contact with the molten metal an exothermic reaction mixture consisting of particles of low-carbon ferrochrome silicon containing about six to fourteen percent of silicon and less than 0.10 percent of carbon, calcium chromate and one or more compounds of the group consisting of sodium nitrate and sodium chlorate, 4. The method of incorporating chromium in molten metal which comprises igniting in contact with the molten metal an exothermic reaction mixture consisting of particles of low-carbon ferrochrome silicon containing about twenty parts per hundred of silicon and less than 0.10 percent of carbon, calcium chromate and one or more compounds of the group consisting of sodium nitrate and sodium chlorate, the one or more compounds of the group consisting of sodium nitrate and sodium chlorate being present in amount sufficient to oxidize about five parts of silicon and calcium chromate being present in amount sufficient to oxidize substantially all of the remainder of the silicon.

5. The method of incorporating chromium in molten metal which comprises igniting in contact with the molten metal an exothermic reaction mixture consisting of particles of low-carbon ferrochrome silicon containing about twenty to forty percent of silicon and less than 0.10 percent of carbon, calcium chromate and calcium chromite.

6. The method of incorporating chromium in molten metal which comprises igniting in contact with the molten metal an exothermic reaction mixture consisting of particles of low-carbon ferrochrome silicon containing about twenty to forty parts per hundred of silicon and less than 0.10 part per hundred of carbon, calcium chromate, calcium chromite and one or more compounds of the group consisting of sodium nitrate and sodium chlorate, the one or more compounds of the group consisting of sodium nitrate and sodium chlorate being present in amount sufficient to oxidize about five parts of silicon and the calcium chromite and calcium chromate being present in amount sufficient to oxidize substantially all of the remainder of the silicon.

7. The method of incorporating chromium in molten metal which comprises igniting in contact with the molten metal an exothermic reaction mixture consisting of particles of low-carbon, low-silicon ferrochrome silicon containing not more than twenty percent of silicon and less than 0.10 percent of carbon, and one or more compounds of chromium containing calcium and oxygen.

8. The method of incorporating chromium in molten metal which comprises igniting in contact with the molten metal an exothermic reaction mixture comprising sodium nitrate and particles of ferrochrome silicon containing less than about forty percent of silicon.

9. The method of incorporating chromium in molten metal which comprises igniting in contact with the molten metal an exothermic reaction mixture comprising particles of ferrochrome silicon containing less than about forty percent of silicon intimately associated with and bonded together by means of sodium nitrate.

10. The method of incorporating chromium in molten metal which comprises igniting in contact with the molten metal an exothermic reaction mixture consisting essentially of low-carbon, low-silicon ferrochrome silicon containing less than about forty percent of silicon, and sodium nitrate.

11. The method of incorporating chromium in molten metal which comprises igniting in contact with the molten metal an exothermic reaction mixture consisting essentially of sodium nitrate and particles of low-carbon ferrochrome silicon containing about four to six percent of silicon.

MARVIN J. UDY.